US006666965B1

(12) United States Patent
Timmons

(10) Patent No.: US 6,666,965 B1
(45) Date of Patent: Dec. 23, 2003

(54) CELLULAR MICROBEAD FILTER FOR USE IN WATER RECIRCULATING SYSTEM

(75) Inventor: Michael B. Timmons, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 9 days.

(21) Appl. No.: 10/171,911

(22) Filed: Jun. 14, 2002

(51) Int. Cl.⁷ .................................................. C02F 3/04
(52) U.S. Cl. ........................................ 210/150; 210/615
(58) Field of Search ................. 210/615, 616, 210/617, 150, 151; 95/172; 96/155, 196

(56) References Cited

U.S. PATENT DOCUMENTS 5,200,081 A * 4/1993 Stuth .......................... 210/615

* cited by examiner

*Primary Examiner*—Robert Popovics
(74) *Attorney, Agent, or Firm*—Schwegman, Lundberg, Woessner & Kluth, P.A.

(57) ABSTRACT

A water recirculating system for use in producing fish. The water recirculating system includes a fish raising tank that provides an environment for fish to grow and a supply system to deliver contaminated water from the fish raising tank to a filtration system. The filtration system includes a chamber with a hydraulic loading area that is divided into a plurality of cells with smaller hydraulic loading areas. Filter media is positioned in each cell to filter the contaminated water received from the fish raising tank. A delivery system returns the filtered water back to the fish raising tank.

7 Claims, 2 Drawing Sheets

CELLULAR MICROBEAD FILTER FOR USE IN WATER RECIRCULATING SYSTEM

TECHNICAL FIELD

This application relates generally to filtration systems and, more particularly, to a water recirculating system for use in producing fish.

BACKGROUND

Raising fish in water recirculating systems requires nitrification treatment systems that maintain acceptable levels of ammonia and nitrite within a water supply. A water recirculating system needs to be able to oxidize an ammonia load that is generated by fish as a result of daily fish feedings.

FIG. 1 illustrates one type of prior art filtration system 10 that may be used in a water recirculating system. The filtration system 10 includes a chamber 12 that contains microbeads 14. Microbeads 14 are sufficiently buoyant such that they float on top of filtered water 16 that collects in the bottom of chamber 12. The microbeads 14 on the bottom are partially submerged in filtered water 16 because they support the weight of the microbeads 14 located above them.

Contaminated water 18 is delivered to filtration system 10 from a number of potential sources, including fish raising tanks where the water supply is contaminated with unsatisfactorily high ammonia loads. Contaminated water 18 is supplied to chamber 12 from above microbeads 14 using any method that uniformly distributes contaminated water 18 over microbeads 14, such as nozzles 13 arranged in a uniform pattern. Gravity forces contaminated water 18 downward through microbeads 14 where it collects in the bottom of chamber 12. Contaminated water 18 applies a force to microbeads 14 as it impacts microbeads 14 such that contaminated water 18 submerges some additional microbeads 14. An exit pipe 20 circulates filtered water 16 back to the contaminated water source.

Microbeads 14 provide a substrate for bacterial growth during operation of filtration system 10. The bacteria on microbeads 14 utilize the ammonia and nitrite as nutrients for even further bacterial growth. The bacterial growth on microbeads 14 also tends to reduce the buoyancy of microbeads 14. Heterotropic bacteria living on the same beads utilize fine organic solids as nutrients for growth resulting in water polishing and general improvement in water quality.

One disadvantage of using a system 10 that includes microbeads 14 is that such systems are limited in size. In systems with large chambers, the strong buoyancy of microbeads 14 causes microbeads 14 to short circuit the flow of water through microbeads 14 in some areas of the chamber. Short circuiting the flow of water through microbeads 14 inhibits the ability of the bacteria on microbeads 14 to oxidize ammonia loads in the water passing through microbeads 14.

The size limitations associated with conventional filtration systems that include microbeads makes it necessary to utilize several chambers when oxidizing commercial ammonia loads (e.g., 9 kilograms TAN per day) that are generated from commercial fish feedings (e.g., 300 kilograms per day). The large number of chambers that are required to handle commercial ammonia loads adds unwanted expense to systems that include microbeads 14.

SUMMARY

A filtration system having a chamber with a hydraulic loading area that is divided into a plurality of cells such that each cell has a hydraulic loading area less than 2.3 square meters. The system further includes a filter media, such as microbeads, positioned in each cell to filter water passing through the chamber. In some embodiments, the microbeads are spherical and have diameters between 1 mm and 3 mm.

The size limitation of conventional microbead filter systems is addressed by dividing the hydraulic loading area in a large chamber into cells with smaller hydraulic loading areas. The smaller hydraulic loading area through each cell promotes efficient filtering by bacteria that grows on the microbeads in each cell.

Another aspect relates to a water recirculating system for use in producing fish. The water recirculating system includes a fish raising tank that provides an environment for fish to grow. A supply system, such as a pumping system, delivers water from the tank to a filtration system. The filtration system includes a chamber with a hydraulic loading area that is divided into a plurality of cells with smaller hydraulic loading areas. Filter media, such as microbeads, are positioned in each cell to filter the water received from the supply system. A delivery system returns the filtered water back to the tank.

These and other aspects, embodiments and features will become apparent from the following description and the referenced drawings.

DETAILED DESCRIPTION

Figure 1:
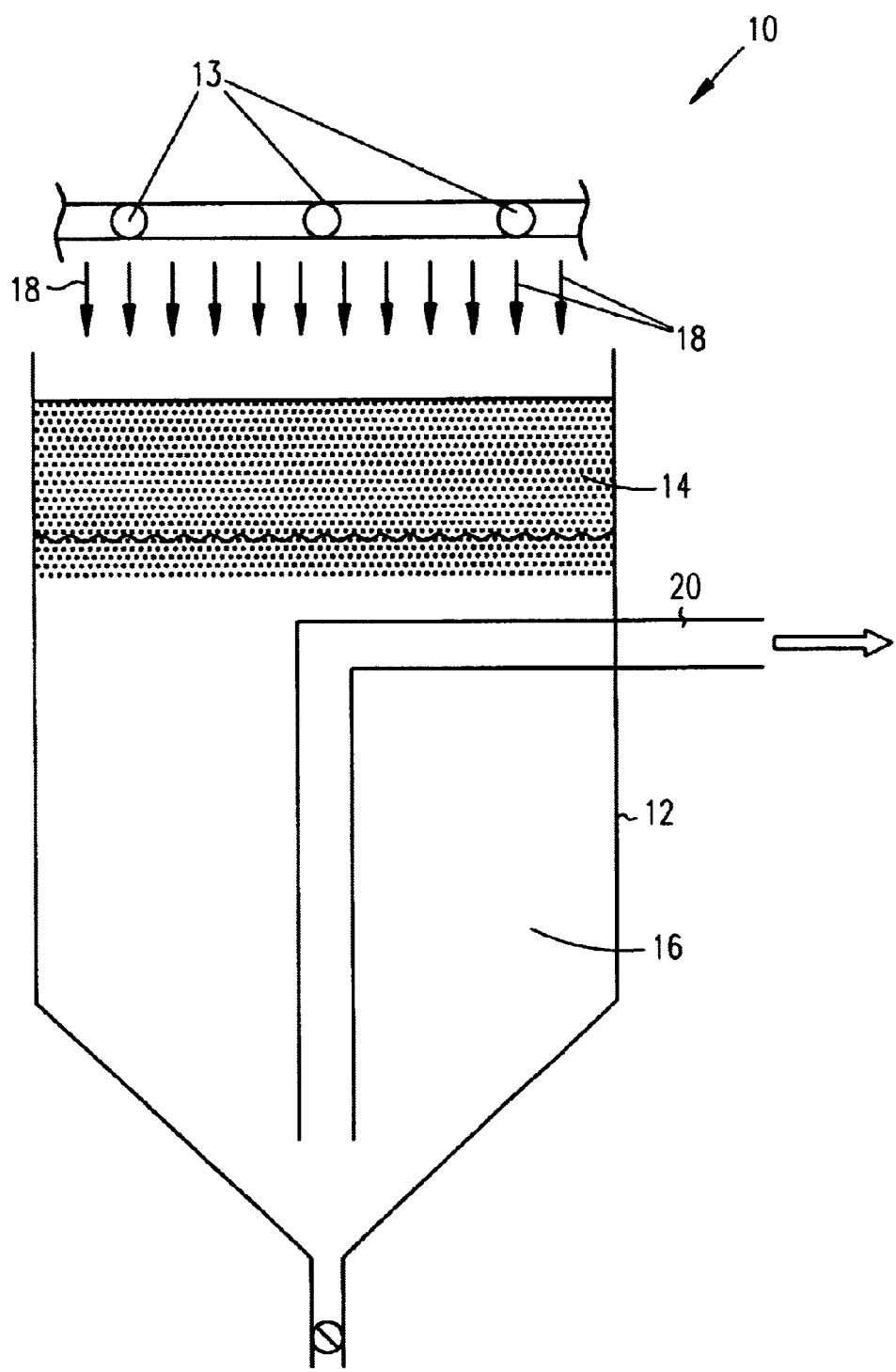
FIG. 1 illustrates a prior art filtration system that includes microbeads.

The following detailed description refers to the accompanying drawings. In the drawings, like numerals describe substantially similar components throughout the several views. These embodiments are described in sufficient detail to enable those skilled in the art to practice the present subject matter. Other embodiments may be utilized and changes may be made. The scope of the present subject matter is defined only by the appended claims, along with the full scope of equivalents to which such claims are entitled.

Figure 2:
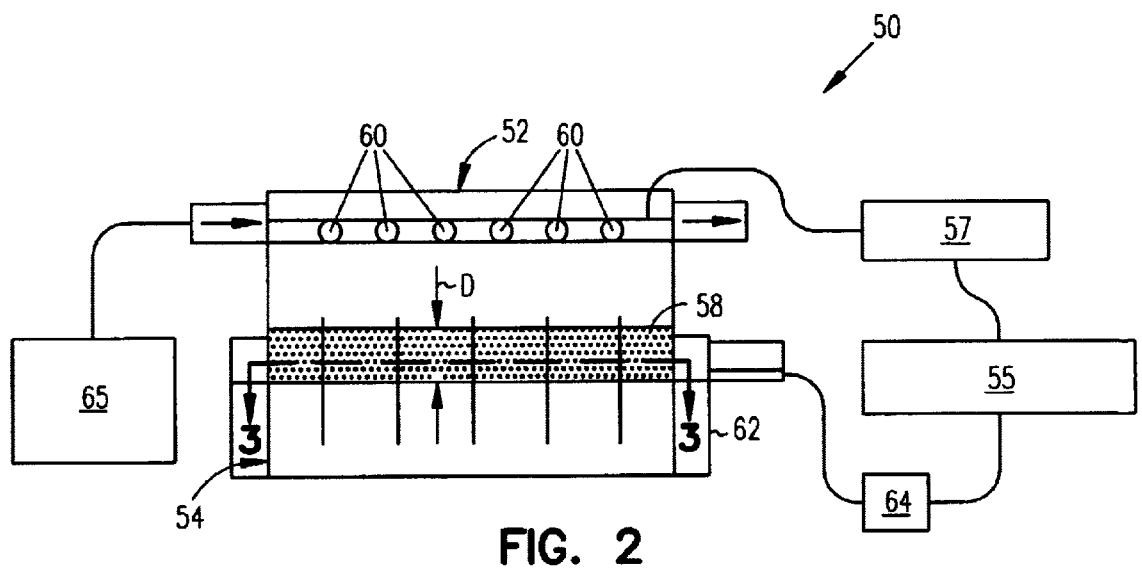
FIG. 2 illustrates a water recirculating system.

FIG. 2 illustrates one embodiment of a water recirculating system 50 that includes a filtration system 52. Filtration system 52 includes a chamber 54 having a hydraulic loading area that is divided into a plurality of cells 56A–H (see FIG. 3) with smaller hydraulic loading areas. A filter media, such as microbeads 58, is positioned in each of the cells 56A–H to filter water that passes through the cells 56A–H.

Figure 3:
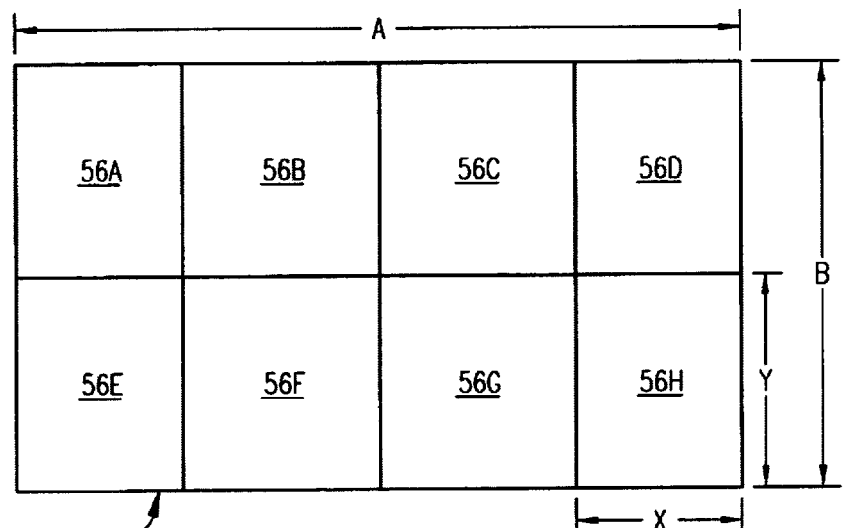
FIG. 3 is a section view of a chamber in the water recirculating system of FIG. 2 taken along line 3—3.

As used herein, hydraulic loading area is a cross-sectional area of a particular portion of the filtration system 52 that is transverse to the flow of water through that particular portion. As shown in FIG. 3, the hydraulic loading area in chamber 54 is equal to dimension A multiplied by dimension B. In the sample embodiment shown in FIG. 3, the hydraulic loading area of each cell is dimension X multiplied by dimension Y (shown for cell 56H only). The size of cells 56A–H may be the same, or varied, depending on the application where filtration system 52 is being used.

Filtration system 52 may further include a plurality of nozzles 60 positioned above microbeads 58 within chamber 54. A supply system 57 may be used to transport contaminated water from a water source, such as a fish raising tank 55. The contaminated water is supplied to nozzles 60 for uniform distribution above each cell 56A–H in chamber 54. In some embodiments, the supply system is a pumping system.

Chamber 54 is at least partially immersed in a receiving tank 62 that holds filtered water after it passes through microbeads 58. A delivery system 64 circulates the water back to fish raising tank 55. In some embodiments, delivery system 64 is a pumping system and fish raising tank 55 is a pond.

In one example embodiment, the water in each cell 56A–H is isolated from the water in the other cells 56A–H as the water flows through microbeads 58. In such example embodiments, the water is unable to flow between cells 56A–H as the water passes through microbeads 58.

The microbeads may be polystyrene, or any other material that adequately filters a particular contaminated water supply. In some embodiments, microbeads 58 are spherical and have a diameter between 1 mm and 3 mm. The density of each microbead may be between 8 kg/cubic meter and 48 kg/cubic meter. Although specific shapes, sizes and properties are described for microbeads 58, it will be appreciated by those of ordinary skill in the art that any microbeads which are calculated to achieve the same purpose may be substituted for the specific microbeads described herein.

In some embodiments, microbeads 58 are positioned within each cell 56A–H such that microbeads 58 have a depth D between 15 cm and 60 cm. The depth D of microbeads 58 will depend on such factors as the size of microbeads 58 and each cell 56A–H in addition to the flow rate of the water through microbeads 58.

In the example embodiment shown in FIG. 3, chamber 54 has a rectangularly-shaped hydraulic loading area as water passes through microbeads 58 and cells 56A–H have either a square or rectangularly-shaped hydraulic loading area. Each cell 56A–H may have a hydraulic loading area less than 2.3 square meters and/or a perimeter greater than 6 meters. In some embodiments, chamber 54 has a hydraulic loading area greater than 4.6 square meters while each cell 56A–H has a hydraulic loading area less than 2.3 square meters. Although specific shapes and sizes are shown and described for chamber 54 and cells 56A–H, it will be appreciated by those of ordinary skill in the art that chamber 54 and cells 56A–H may have any shape and size that adequately functions in filtration system 52. In addition, the number of cells may vary to suit particular applications.

Filtration system 52 may also include an air passage 64 positioned above microbeads 58. A fluid source 65 forces a fluid, such as air, to pass by the water before it drops onto microbeads 58. Passing air by the water strips undesirable carbon dioxide from the water before the water passes through microbeads 58. Carbon dioxide is extremely soluble in water such the carbon dioxide stripping may be necessary in some recirculating applications. In some embodiments, fluid source 65 may be integrated with a ventilation system of the building where filtration system 52 is located.

Although specific embodiments have been illustrated and described herein, it will be appreciated by those of ordinary skill in the art that any arrangement which is calculated to achieve the same purpose may be substituted for the specific embodiments shown. This application is intended to cover a water recirculating system in applications other than those related to fish raising, including mining, municpal and home wastewater treatment, car washes, laundry mats and other similar applications.

It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A filtration system for use in a water recirculating system, the filtration system comprising:
   a chamber that includes a hydraulic loading area divided into a plurality of cells such that each cell has a hydraulic loading area less than 2.3 square meters:
   microbeads positioned in each cell to filter water passing through the chamber, the microbeads being spherical and having diameters between 1 mm and 3 mm, wherein the microbeads have a density that is between 8 kg/cubic meter and 48 kg/cubic meter and the microbeads within each cell forming a layer having a depth between 15 cm and 60 cm;
   a plurality of nozzles positioned above the microbeads within the chamber to supply contaminated water to each cell in the chamber; and
   a receiving tank for holding filtered water received from the chamber, the chamber being at least partially immersed in the receiving tank.

2. The filtration system of claim 1 wherein the water in each cell is isolated from the water in the other cells as the water flows through the microbeads.

3. The filtration system of claim 1 further comprising an air passage positioned above the filter media to pass air by the water to strip carbon dioxide from the water.

4. The filtration system of claim 1 wherein the microbeads are polystyrene.

5. The filtration system of claim 1 wherein the chamber includes 8 cells.

6. The filtration system of claim 1 wherein each cell has a perimeter greater than 6 meters.

7. The filtration system of claim 1 wherein the chamber has a hydraulic loading area greater than 4.6 square meters at a location where water passes through the filter media.

* * * * *